United States Patent Office 3,429,800
Patented Feb. 25, 1969

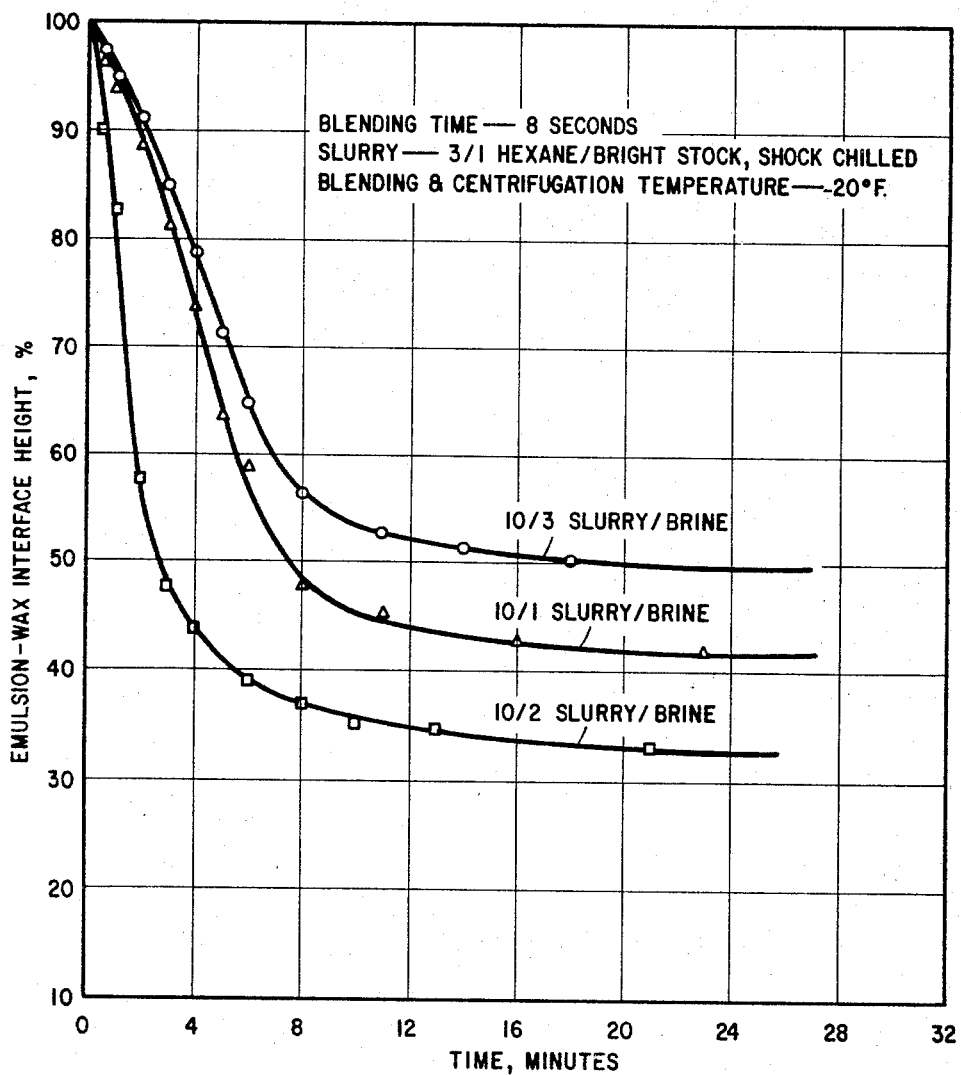

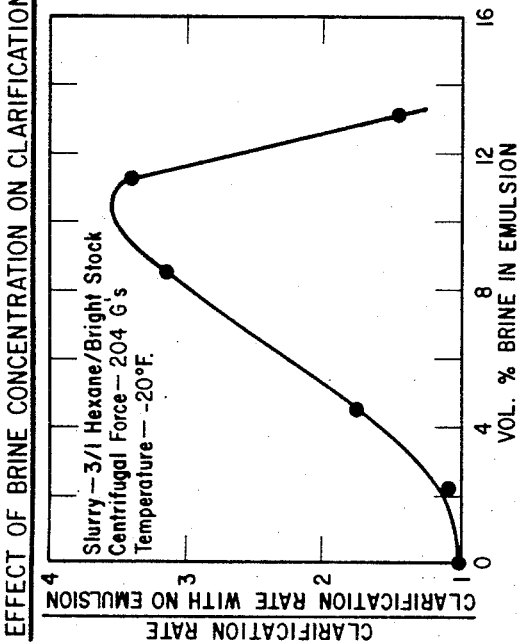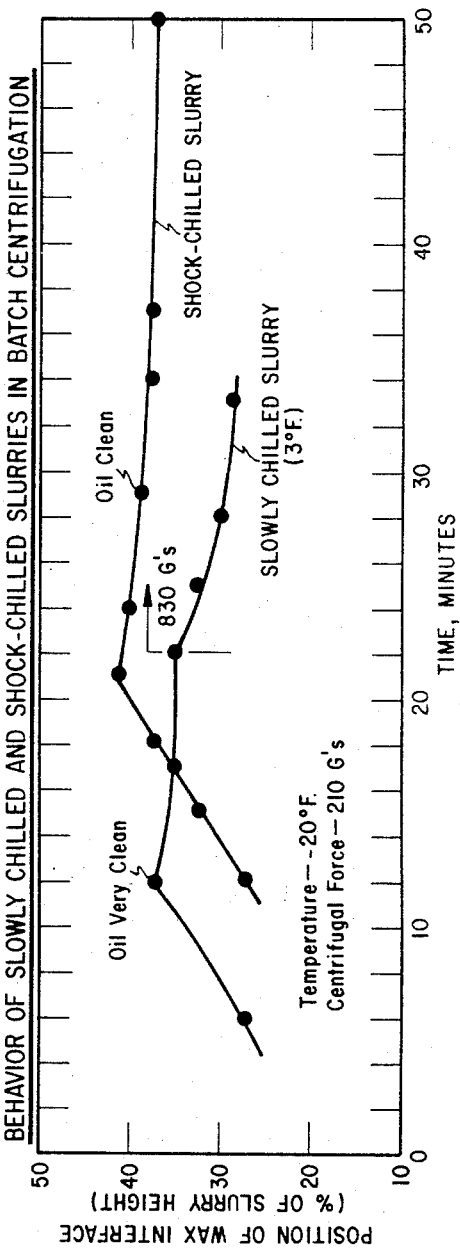

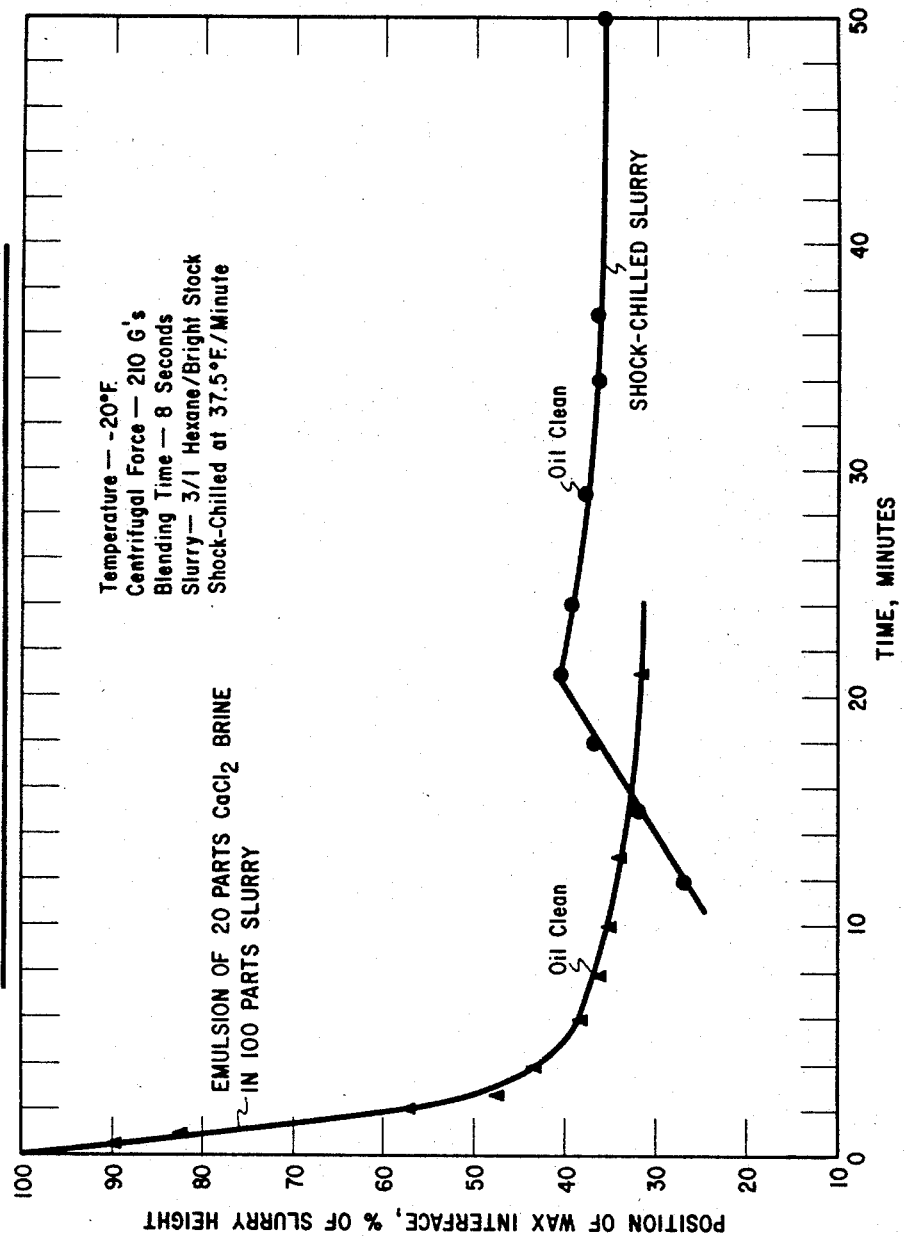

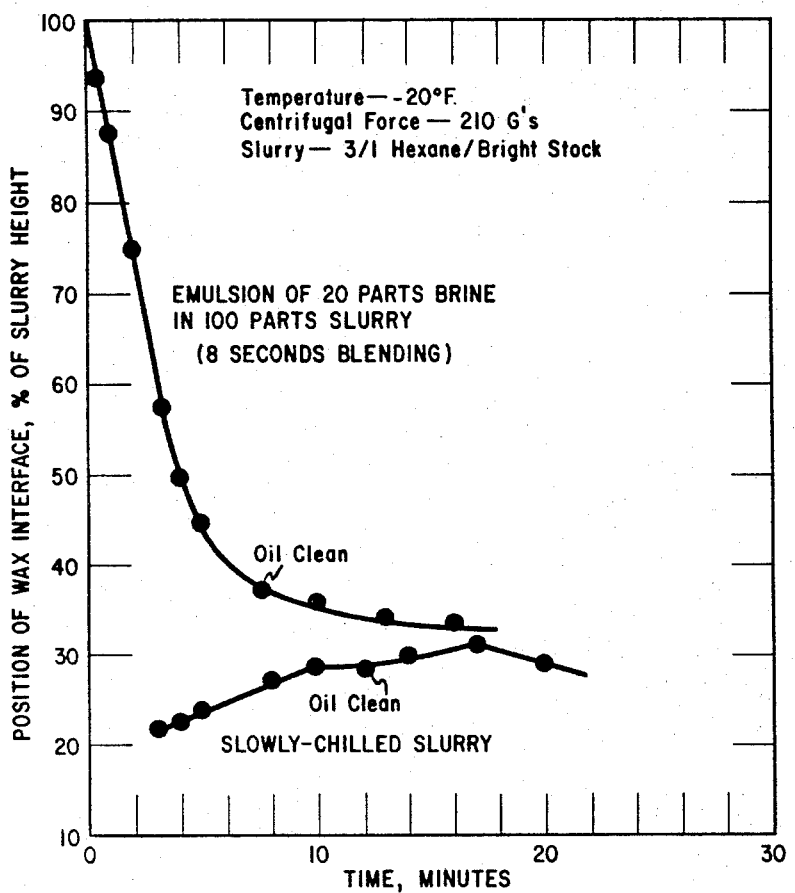

3,429,800
EMULSION DEWAXING WITH IMMISCIBLE
LIQUID DISPERSED IN A CONTINUOUS
OIL WAX SLURRY PHASE
Robert E. Sparks, Westfield, N.J., assignor to Esso Research and Engineering Company, a corporation of Delaware
Continuation of application Ser. No. 299,237, Aug. 1, 1963. This application June 22, 1967, Ser. No. 648,171
U.S. Cl. 208—29   9 Claims
Int. Cl. C10g 43/04

ABSTRACT OF THE DISCLOSURE

Wax is removed from oil by chilling the finely-divided wax particles, mixing the wax-oil slurry with brine or other heavy oil immiscible liquid, forming an emulsion of droplets of the heavy liquid dispersed in oil, and separating the droplets from the oil by centrifugation or settling. The wax particles adhere to the droplets of the immiscible liquid and are removed with the droplets of the immiscible liquid.

---

This application is a continuation of application Ser. No. 299,237, filed Aug. 1, 1963, now abandoned.

This invention relates to a process of separating solid particles from a liquid. This invention relates to a process of separating small solid particles from a liquid by emulsifying the liquid with a more dense immiscible liquid whereby the solid particles are adsorbed on or made to adhere to the emulsified droplets of the second, more dense liquid.

In many situations solid particles dispersed in a liquid are so small and of such low density difference from the liquid in which they are contained that centrifugation of these solid particles from the liquid has proven exceedingly difficult and time-consuming.

This invention is specifically directed to a method of improving the rate of settling of the solids and clarification of the liquid containing the dispersed solids in a centrifuge. The liquid containing the dispersed solid particles is emulsified with a dense immiscible liquid forming dense liquid droplets in the liquid containing the solid particles. On contact with the emulsified droplets, the small solid particles adhere to the droplets. The motion of the small solid particles through the carrier liquid thus becomes a strong function of the physical properties of the droplets.

More specifically, this invention relates to a method of improving the settling rate of crystallized wax particles in an oil-wax slurry and the clarification rate of the oil in a centrifuge. The settling rate of the wax crystals in the centrifuge is greatly increased by emulsifying a heavy liquid in the wax-oil slurry whereby the wax crystals attach to the droplets of the heavy liquid, and the settling rate of the wax crystals becomes a function of the density and the size of the droplets as distinguished from the density and size of the crystals.

In the conventional processes, separation of crystallized wax from wax-oil slurry has been severely limited by the size of the wax crystals formed and the density difference between the wax crystals and the wax-oil slurry. In order to get efficient separation in the centrifuge, it was necessary to obtain relatively large, uniform size wax crystals. Generally, in order to obtain large wax crystals it was necessary to carry out the dewaxing step at slow chill rates under carefully controlled chilling conditions. Rapid or shock chilling formed wax crystals which were extremely fine and difficult to separate by centrifugation due to the combination of small size and low density difference of the fine crystals in the wax-oil slurry. Therefore, commercial processes for dewaxing have developed around a slow chill rate procedure.

There are two large scale commercial dewaxing processes, namely, the propane and the MEK/toluene process. Propane dewaxing involves direct contact between propane and the oil to be dewaxed and vaporization of propane from the mixture. The mixture is thus auto-refrigerated and chilled at a carefully controlled rate at about 1 to 12° F./minute. After the chilling step, the wax-oil slurry is removed from the chilling apparatus and filtered on large, rotating filters. Recent developments in the centrifugation art have allowed this wax-oil slurry to be efficiently separated by centrifugation.

Slow chill rates as defined herein mean chilling the oil being dewaxed at a rate of 1–10° F./minute while maintaining a correspondingly low temperature difference between the forming crystals and the cooling medium of about 1–10° F. Differences in temperature of above 10° F. or chill rates of above 10° F. per minute constitute shock chilling as defined herein.

In MEK/toluene dewaxing, the waxy oil feed is mixed with the solvent and charged to a double pipe scraped surface heat exchanger where it is chilled to the desired dewaxing and filtering temperature. This process has the same inherent limitations as the propane dewaxing process in that the process is chill rate limited; and, in order to get the necessary crystal size which can easily be filtered and/or centrifuged, the chill rate in this case is also limited to about 1–12° F./minute.

Depending on the particular oil being dewaxed, wax crystals of the size of 10-100 microns can be obtained by the conventional processes. If the feeds are shock chilled, the wax crystals are about 1–10 microns in size. The wax crystal formation obtained will vary with the particular feed and the chill rate. The addition of crystal modifiers which are normally added also affects the crystal structure. It can readily be seen from the above description that the dewaxing capacity of a particular dewaxing unit is limited by chill rates and filtration or centrifugation rates. The centrifugation rate is a function of the clarification rate of the solid particles from the dewaxed oil in the centrifuge. The present invention is directed to substantial improvement in clarification rates. This invention provides an efficient means of overcoming a filtration or centrifugation bottleneck in dewaxing plants.

Another problem encountered in separating wax crystals from dewaxed oil in centrifuges has been that the wax in certain waxy feed stocks tends to stick to the internals of the centrifuge thereby building up wax layers and eventually plugging and rendering the centrifuge inoperable for the dewaxing step.

The present invention relates to a method of separating solid particles in a centrifuge from a light liquid containing the solid particles by adding to the light liquid a heavy, immiscible liquid in such a manner as to form an emulsion of droplets of the heavy liquid dispersed in the light liquid. The solid particles in the light liquid adhere to the droplets of heavy liquid at the interface between the two liquids. The clarification rate of the solids in the light liquid when centrifuged then is dependent only to a negligible degree upon the difference in density of the solids and liquid, and is dependent primarily upon the size and density difference between the light liquid and the heavy droplets of immiscible liquid dispersed in and forming the emulsion in the light liquid.

Since the density of the heavy liquid can be selected to suit the separation carried out, considerable advantage can be realized in clarification of liquids in centrifuges.

In some situations, depending upon the physical and chemical characteristics of the heavy and light liquids, a surface active agent and/or crystal modifier may be added to obtain a good emulsion and to improve the adhesion of the solids in the light liquid to the emulsified heavy liquid droplets.

In a particular application of the present invention, this technique is used to improve clarification of wax crystals from a wax-oil slurry by mixing with the wax-oil slurry a heavy immiscible liquid which forms small droplets dispersed throughout the wax-oil slurry. The wax particles in the wax-oil slurry adhere to the surface of the immiscible heavy droplets in the emulsion. The wax separation rates then become a function of the droplet diameter and density rather than of the wax crystal diameter and density. In dewaxing hydrocarbon liquids, the density of the crystallized wax particle is generally very close to the density of the dewaxed hydrocarbon. Heretofore, in order to obtain efficient clarification of liquids by centrifugation it has been necessary to obtain relatively large crystals to offset this small density difference.

The settling velocity of a small particle through a fluid can be calculated by the following formula.

$$v_T = \frac{\Delta p g D^2}{18\mu}$$

Where
$v_T$ = Terminal velocity of the particle
$g$ = Acceleration of gravity
$D$ = Diameter of particle
$\Delta p$ = Density difference between particle and fluid
$\mu$ = Viscosity of fluid A solid particle of specified diameter and density in a fluid of specified viscosity will settle at a specific rate if there is a density difference between the particle and fluid. By dispersing in the fluid a more dense droplet of larger particle size and having the particle adhere to the larger, more dense droplet, the settling velocity of the particle can be greatly increased. As can be seen from the formula, the size of the particle has a greater effect on the settling velocity than the density of the particle, i.e., a square function.

By attaching the particle to a larger, more dense liquid droplet, two effects are seen. The settling velocity is increased because the higher density of the droplet increases the $\Delta P$. The settling velocity is also increased because of the larger diameter of the liquid droplet.

The present invention includes separation of crystals obtained by slow chilling a waxy oil feed, whereby the larger crystals are obtained, and for the first time practical separation of very small wax crystals formed by shock chilling a waxy oil feed. This invention allows the use of the shock chilling of waxy oil feeds which can be carried out at higher rates with small equipment for the first time.

In accordance with a preferred embodiment of the present invention, a micro-crystalline waxy oil feed is dewaxed in a conventional propane dewaxing or MEK/toluene dewaxing process. The wax-oil slurry is mixed with a heavy immiscible liquid, such as an aqueous brine solution, to obtain a dispersion of the aqueous brine solution in the wax-oil slurry of aqueous droplets 2–50 microns in diameter. The wax particles in the slurry are 0.5–2 microns in diameter. On contact with the droplets the wax particles adhere to the brine droplets at the brine-oil interface. The small crystals are found to be adsorbed on the surface of the brine droplets and when the emulsion is centrifuged, these small crystals "ride" the brine droplet out to the peripheral area of the centrifuge thereby separating the wax and brine from the clarified oil. The settling rate of the wax crystals from the wax-oil slurry is thereby greatly increased because the wax has become part of a wax-brine particle having a density difference between it and the dewaxed oil of approximately 0.5 as opposed to a density difference between the wax alone and a dewaxed oil of only about 0.2. An even stronger advantage is gained by the increase in diameter of the particle being separated. For example, a 2-micron wax particle adhering to a 10-micron brine droplet has its settling rate increased by the square of the diameter difference, or 25 fold.

Using the emulsion technique of the present invention thereby makes the clarification capacity of the centrifuge a function of density and droplet size of the brine droplet rather than of the density and particle size of the wax particle. By making the centrifuge clarification capacity independent of wax particle size, shock chilling can now be used for dewaxing. The small wax particles which are thereby produced can be separated from the wax-oil slurry by this emulsion technique.

It was found that a definite mixing energy at a high energy input was required to obtain stable emulsions of the heavy liquid. The energy input, however, varies with a particular feed. It was noted that in specific situations pertaining to dewaxing of waxy oil stocks and in dealing with wax-oil slurries that simple mixing of an aqueous brine with wax-oil slurry was not effective in producing emulsion or adherence of wax crystals to brine droplets. It was also found that passage of a mixed stream of brine and wax-oil slurry through a gear pump was not effective in forming emulsions of aqueous brine in the wax-oil slurry.

Applicant's novel technique for separation of small particles from a light liquid offers several process advantages over prior art processes. These advantages apply to liquid-solids systems where it is desired to improve the settling rate of the solids and clarification rate of the liquid. This technique has particular application to wax-oil slurries where the wax crystals have a density close to that of the oil from which it is desirable to separate the crystals. Substantial increases in the clarification rate of the dewaxed oil can be obtained according to this technique. This technique can be used to clarify oils containing wax crystals obtained by slow chilling at 1–10° F. per minute or to separate fine crystals obtained by shock chilling of waxy oil feeds at chill rates substantially above 10° F. per minute.

The conditions at which the centrifugation or settling is carried out are those normally used in dewaxing. For example, the centrifugation or settling temperature would be substantially the same as the temperatures of the dewaxing operation. The pressure is not critical but would be sufficient to maintain the wax-oil slurry in the liquid phase. The particle size will vary with the particular materials being separated. Shock chilling waxy feeds, for example, can give crystal sizes of ¼ to 10 microns whereas slow chilling waxy-oil feeds can give wax crystal sizes up to 200 microns. The size of the droplet formed by the heavy immiscible liquid will depend upon the physical characteristics of the two liquids being emulsified. The average size will generally be in the range of about 5 microns up to about 500 microns. The heavy immiscible liquid and the light liquid containing the solids are mixed and highly agitated for a sufficient time to obtain a relatively stable emulsion of the heavy liquid droplets in the light liquid continuous phase. The gravitational field to which the emulsified feed is subjected in the centrifuge will depend on the particular materials being separated and can vary between about 100 G's to about 13,000 G's or higher. However, an advantage of using this technique is that the same clarification rates can be obtained at substantially lower G's, or substantially higher clarification rates can be obtained at the same G's.

Generally, the feed from which the solids are to be separated will be mixed with a suitable solvent to obtain desired emulsion characteristics, crystal habit, and adherence of solid particles to the emulsified droplets. Various surface-active agents and/or crystal modifiers can be added to the emulsion to effect the attraction and adherence of the solid particles to the emulsion droplet interface as well as to effect the interfacial tension between the heavy immiscible liquid and the light liquid containing the solids.

FIGURE 1 of the attached drawings is a graph showing the effect of the concentration of brine emulsified in the wax-oil slurry on the rate of clarification of the emulsion.

FIGURE 2 is a graph showing the ratio of the clarification rate without brine as compared with the clarification rate with the brine emulsion.

FIGURE 3 of the drawings is a graph showing the clarification characteristics of slowly chilled wax crystals in a wax-oil slurry and of shock chilled wax crystals in a wax-oil slurry.

FIGURE 4 is a graph comparing the rate of clarification of wax from a shock chilled wax-oil slurry with the brine emulsion and without the brine emulsion.

FIGURE 5 of the drawings is a graph illustrating the rate of clarification of wax from an emulsion of a slowly chilled wax crystal from a wax-oil slurry as compared with the rate of clarification of a slowly chilled wax crystal from a wax-oil slurry without emulsion.

Feed materials which can be separated in accordance with the present invention may constitute any liquid containing discrete solid particles in the liquid from which it is desired to separate the solid particles by simple settling or by centrifugation. The closer the density of the solids to the liquids, the more advantageous it would be to use the present invention to assist in carrying out the separations. The invention has particular application to the separation of crystallized wax particles from a wax-oil slurry. Hydrocarbon fractions boiling above 250° F. and containing various amounts of wax, depending on whether it is a simple dewaxing operation of a whole crude, dewaxing of a fraction to make a lubricating oil product, dewaxing of a fraction to obtain a specific wax product, or deoiling of a petrolatum, can be treated in accordance with the present invention. Specific feeds would be paraffinic, crystalline, and micro-crystalline waxy oil feeds. The particular feed can be dewaxed by conventional propane dewaxing or MEK/toluene dewaxing or any other suitable conventional type of dewaxing process.

A specific feed which is dewaxed is Solvent 100 Neutral which has the following characteristics.

Feed:

| | | |
|---|---|---|
| API gravity | | 34.6 |
| Pour point | ° F | 90 |
| Cloud point | ° F | 95 |
| Distillation at 10 mm. Hg: | | |
| IBP | ° F | 280 |
| 5% | ° F | 394 |
| 50% | ° F | 480 |
| 95% | ° F | 536 |
| Density of DWO at −40° F. | | 0.902 |
| Density of Wax at −40° F. | | 0.935 |
| Percent Wax recovered | Wt. percent | 15 |
| Pour point DWO | ° F | +20 |
| Cloud point DWO | ° F | +25 |

Another feed dewaxed in accordance with the present invention is bright stock which has the following characteristics.

Feed:

| | | |
|---|---|---|
| API gravity | | 26.9 |
| Pour point | ° F | 125 |
| Distillation: | | |
| 5% | ° F | 897 |
| 30% | ° F | 989 |
| Density of DWO at −40° F. | | 0.935 |
| Density of Wax at −40° F. | | 0.957 |
| Percent Wax removed | Wt. percent | 15 |
| Pour point DWO | ° F | 20 |

The heavy immiscible liquids which are emulsified and dispersed in the light liquid containing the solids to be separated can be any liquid which when dispersed in the light liquid forms a stable emulsion either by itself or with the addition of a suitable surface active agent. The dispersed liquid should also attract and adsorb the solid particles in the light liquid. This can be done with or without adding crystal modifiers or suitable surface active agents. Heavy immiscible liquids that can be used are water, calcium chloride brine solution, and aqueous solutions of water-soluble salts. Other liquids that can be used are glycerine, glycols, alcohols, and their solutions in water and the like.

Suitable diluents can be added to the material being treated in order to advantageously affect its density so that the desired separation can be carried out, or in order to affect the physical characteristics of the solid in the material being separated. Particularly in relation to centrifuging or settling wax crystals from wax-oil slurries, diluent solvents such as naphtha, propane through hexane may advantageously be used, as well as ketones, aromatic hydrocarbons, and chlorinated hydrocarbons.

In any particular system in which a separation is carried out, the interfacial tension between the light liquid and the immiscible heavy liquid is an important feature in the process in that it affects the formation of the stable emulsion. It is necessary to have sufficiently stable emulsion to allow time for the solid particles in the light liquid to be attracted to, migrate, and adhere to or be adsorbed on the dispersed droplet of the immiscible heavy liquid. With reference to wax-oil slurries, depending on the particular wax-oil slurry being emulsified with a particular immiscible heavy liquid, such as aqueous brine solution, the interfacial tension is important. In some feeds, stable emulsions will form with reasonable amounts of energy input in a suitable mixing device without the addition of surface active agents. With other feeds, surfactants need to be added to obtain stable emulsions. Some stocks contain natural surface active agents. Other wax-oil slurries contain a dewaxing aid added to carry out the dewaxing operation, which dewaxing aid is normally surface active and which can aid in the formation of a stable emulsion. The wetting characteristic of the wax crystals is related to the particular feed from which it was precipitated. Frequently the wax crystals will have the proper wetting characteristics so that they attach to the surface of the emulsion particle and are rapidly removed from the wax-oil slurry by centrifugation.

The temperature at which the mixing and centrifugation or settling techniques can be carried out is between about −100° F. and +200° F. depending on the particular solids to be separated. In separating wax crystals the temperature can be −150° to +100° F., preferably −50° F. to +20° F. The pressure at which the mixing and dewaxing is carried out is sufficient to maintain the materials in a liquid phase. In order to form a stable emulsion, the light liquid with the solids must be mixed with heavy immiscible liquid for sufficient time to obtain a highly agitated mixture in which the heavy immiscible liquid is dispersed as small droplets in the continuous phase light liquid. The energy input will vary with the feeds treated. In emulsifying wax oil slurries in an aqueous brine system, sufficient mixing time is used to obtain a stable emulsion. The centrifuge may be operated within wide limits which are conventionally used to separate solids from light liquids and would depend on a particular material being separated.

In dewaxing, the particle size of the wax crystals to be separated would depend on the particular stock being treated and the method at which it was chilled. For slow chilled paraffinic waxes the particle size range will be about 2 to 50μ. Shock chilled paraffin stocks will have crystal size range of about 1 to 20μ. Slow chilled micro crystalline stocks will have a crystal aggregate size range of 1 to 30μ, more generally 1 to 10μ and shock chilled micro crystalline stocks will have crystal size range of 0.5 to 5µ.

Clarification of the particular emulsions treated whether they are solids in light liquids or wax crystals in wax-oil slurries can be obtained by using conventional settling techniques, or any centrifuges which will normally separate solids from light liquids. The present invention is not to be limited to a specific means of centrifuge separation or settling technique, but can be adapted to improve any of the specific centrifuge or settling techniques now in use by increasing the relative density and effective particle diameter of the particles being centrifuged thereby making it easier to centrifuge these particles than would normally be possible.

The invention will be better understood and be more clearly illustrated with reference to the following examples.

EXAMPLE 1

The emulsions were prepared in this example, as well as the following examples, by using a Waring Blendor with a variac series with a motor to allow speed controls in the blender at 5500 r.p.m. to 17,500 r.p.m. The cold aqueous calcium chloride brine was usually put into the blender and cold solvent wax-oil slurry was added to the blender and the blending step was carried out by agitation at high speed for the period of time needed to obtain a stable emulsion.

A 28% by weight aqueous brine solution having a density of 1.28 was used as the heavy immiscible liquid to form the emulsion. Several runs were carried out to determine the optimum brine concentration with the particular wax-oil slurry. Three emulsions of calcium chloride brine in 3/1 hexane/waxy bright stock slurry were prepared.

In these runs a different brine concentration was used to prepare the emulsions to show the effect of brine concentration. The wax-oil slurry was prepared by shock chilling the bright stock at a rate of approximately 50° F. per minute. The slurry to brine ratios used were 10 to 1, 10 to 2 and 10 to 3. All were blended in the Waring Blendor for 8 seconds at approximately 16,000 r.p.m. The emulsions were then batch centrifuged at the dewaxing temperature of −20° F., giving the centrifugation curves shown in FIGURE 1. These three runs indicate that there is not only a difference in the rates of clarification, but also a strong difference in the equilibrium wax levels obtained. The data clearly show that there is a critical amount of immiscible heavy liquid that should be emulsified with a particular feed to obtain the best results. From FIGURE 1 it is seen that the 10 to 2 ratio of wax-oil slurry to brine results in the maximum amount of clarification in the minimum time and also a lower equilibrium wax level.

EXAMPLE 2

In order to compare the effect on initial settling rate of the concentration of brine in the emulsion in a bright stock slurry, emulsions were prepared containing varying amounts of brine. The slurry was a 3 to 1 hexane/bright stock slurry which was mixed in the Waring Blendor using four seconds blending time. The bright stock slurry had been shock chilled at approximately 50° F./minute from 140 to −20° F. The rate of clarification of the material was based upon the time required to clarify the upper 40% of the sample. The data obtained are illustrated in FIGURE 2 of the drawings. For a blending time of four seconds, about a 10% brine concentration in the emulsion is shown to give the best separation. At this concentration, the ratio of the clarification rate with emulsion to the clarification rate of the slurry containing no emulsion is approximately 3.6 to 1. To determine the best brine concentration for a particular liquid solids mixture, curves of this type should be obtained for the mixture.

EXAMPLE 3

The effect of shock chilling a feed as compared with slow chilling a feed on the settling rate of the wax crystals formed in the wax-oil slurry is shown in FIGURE 3 of the drawings.

A portion of bright stock feed was chilled from a temperature of about 80° F. at a rate of 37.5° F./minute to a temperature of −20° F. The wax crystals obtained were about 1–4µ in size. Another portion of the feed wax chilled from a temperature of about 80° F. at a rate of 2–3° F./minute to −20° F. The wax crystal aggregates obtained were about 3 by 30µ in size. Both samples were then centrifuged at −20° F. and 210 G's. The slow chilled slurry was also centrifuged at 830 G's. The wax-oil slurry had a density of about 0.75 and the wax crystals a density of about 0.94.

The data obtained show that the shock chilled wax crystals separate much more slowly in the centrifuge than the slow chilled crystals. For example, the slow chilled slurry was very clean after 12 minutes of centrifugation and the wax-oil interface was only 37% of the slurry height. The shock chilled slurry took 29 minutes to become clear and the wax-oil slurry was 38.5% of the slurry height.

To show the unexpected improvement obtained in clarification rates by using applicant's novel emulsion technique with both slow chilled and shock chilled slurries, 100 part samples of both the shock chilled and slow chilled slurries obtained in the manner described above were mixed with 20 parts of an aqueous calcium chloride brine solution having a specific gravity of 1.28. The mixtures were each fed to a Waring Blendor operated at about 16,000 r.p.m. The mixtures were subjected to the action of the blender for about 8 seconds and formed very stable emulsions. Aqueous brine droplets were dispersed in the slurry and the size range of the droplets was about 2–40µ.

The wax crystals in both emulsions because of the wetting characteristics of the wax adhered to the emulsion droplets. This effectively increased the size and density of the wax crystals as far as centrifugation is concerned to that of the combined droplet and wax.

The shock chilled emulsion was centrifuged at −20° F. at 210 G's and the results obtained compared with those obtained by centrifuging the shock chilled slurry without the addition of brine. The data obtained are presented in FIGURE 4 of the drawings. The shock chilled sample with the added brine became clear after only 8 minutes of centrifugation and the wax-oil slurry interface level was about 37% of the slurry height. This represents a substantial improvement over the results obtained without using the emulsion technique.

In this run a reasonably clean interface moved slowly down the centrifuge tube. This was different from the centrifugation of the unemulsified slurry in which the larger particles settled first, then the smaller ones, until the oil was clear.

The important difference is that clarified oil above the sedimenting material was free of wax particles in less than one-third the time required with the non-emulsified slurry.

A similar comparison under the same conditions was made with the slow chilled wax-oil slurry. The data obtained are shown in FIGURE 5 of the drawings. It can be seen from this drawing that with the emulsified slurry, clear oil was obtained in about seven and one-half minutes as compared to twelve minutes for the unemulsified slurry. The same type of improvement, though not as pronounced as with the shock chilled slurries, was observed.

There are several obvious alternatives which will occur to those skilled in the art from the above described invention and these obvious alternatives are intended to be included within the scope of the present invention. For example, instead of using a conventional centrifuge, a large settling tank can be used to separate the solid particles and emulsion droplets from the light liquid.

This technique can also be used in centrifugation to remove solids by employing as the emulsified liquid a liquid of lighter density than the carrier liquid. In this case, solids of very close density to the carrier liquid or of lighter density than the carrier liquid would be removed with the droplets as the light material. In this case, the light solids adhering to the light droplets would move toward the central axis of the centrifuge and the heavier carrier liquid would move radially outward under the gravitational field established in the centrifuge. Otherwise, the technique already described remains substantially unchanged.

Also, centrifugal separators rather than centrifuges could be used. This invention has several applications where they can replace existing filters or enlarge the capacity of existing centrifuge separation units. The technique makes possible for the first time the economic separation of shock chilled wax slurries, thereby removing the chill rate limitation in existing dewaxing processes. Though the particular use described here is in connection with dewaxing, this technique has obvious utilities in any process where solids are to be separated from light liquids. For example, this technique can be used in the separation of crystallized chemicals from the solutes. Other examples include dewaxing of crude oils, dehazing of lubricating oils, etc.

Having described the invention, it is intended that the invention include all the variations which will occur to those skilled in the art and should be only limited to the scope of the appended claims.

I claim:
1. An improved process for separating wax particles from a waxy oil which comprises shock chilling said oil whereby solid particles of wax which are relatively small in size are precipitated from said waxy oil and a wax oil slurry forms, adding an immiscible aqueous liquid of greater density than said oil to said wax oil slurry, forming an emulsion of said aqueous liquid and said wax oil slurry, said wax oil slurry being the continuous phase, and said aqueous liquid being dispersed in said wax oil slurry in the form of aqueous liquid droplets, wherein an interface forms between the said aqueous liquid droplets and said wax oil slurry, adhering said wax particles to said interface, feeding said emulsion to a centrifuge whereby the dispersed aqueous liquid droplets and the adhering wax particles are separated from the said wax oil slurry.

2. The process of claim 1 wherein said emulsion is formed by high speed agitation of said immiscible aqueous liquid and said wax oil slurry.

3. An improved process for separating wax particles from a waxy oil which comprises shock chilling said waxy oil thereby forming a wax oil slurry which contains small wax particles, admixing with said wax oil slurry an immiscible heavy liquid, emulsifying said heavy liquid and said wax oil slurry by high speed stirring whereby droplets of said heavy liquid are dispersed within said wax oil slurry, said wax oil slurry being the continuous phase; adhering wax particles to said droplets at the interface of said droplets and said slurry, feeding said emulsion to a centrifuge whereby the dispersed heavy liquid droplets and the adhering wax particles are separated from the oil.

4. The process of claim 3 wherein said stirring takes place at a rate of 550 to 17,500 r.p.m.

5. The process of claim 4 wherein said shock chilling rate is at least 10° F. per minute.

6. An improved process for separating wax particles from a shock chilled wax oil slurry which comprises mixing with said wax oil slurry an immiscible heavy liquid forming an emulsion of said heavy liquid and said wax oil slurry, said wax oil slurry being the continuous phase, said heavy liquid being dispersed in said wax oil slurry in the form of heavy liquid droplets, said wax particles adhering to said droplets, feeding said emulsion to a centrifuge whereby the dispersed heavy liquid droplets and the adhering wax particles are separated from the oil.

7. The process of claim 6 wherein a surface active agent is added to assist in forming a stable emulsion.

8. The process of claim 6 wherein crystal modifiers are added to improve the wetting characteristics of the wax particles so that they adhere to the heavy liquid droplets.

9. The process of claim 6 wherein the heavy immiscible liquid is an aqueous brine solution.

References Cited
UNITED STATES PATENTS

| | | | |
|---|---|---|---|
| 1,351,265 | 8/1920 | Sharples | 208—33 |
| 2,041,885 | 5/1936 | Walch | 208—29 |
| 2,168,143 | 8/1939 | Schutte | 208—29 |
| 2,915,449 | 12/1959 | Doorn et al. | 208—29 |
| 3,350,296 | 10/1967 | Torobin | 208—33 |

OTHER REFERENCES

National Petroleum News, Nov. 13, 1940, "Emulsion Deoiling Process Separates Oil-Wax Mixtures," pp. 402–407.

DANIEL E. WYMAN, *Primary Examiner.*

P. E. KONOPKA, *Assistant Examiner.*

U.S. Cl. X.R.

62—58; 208—33